Figure 1:
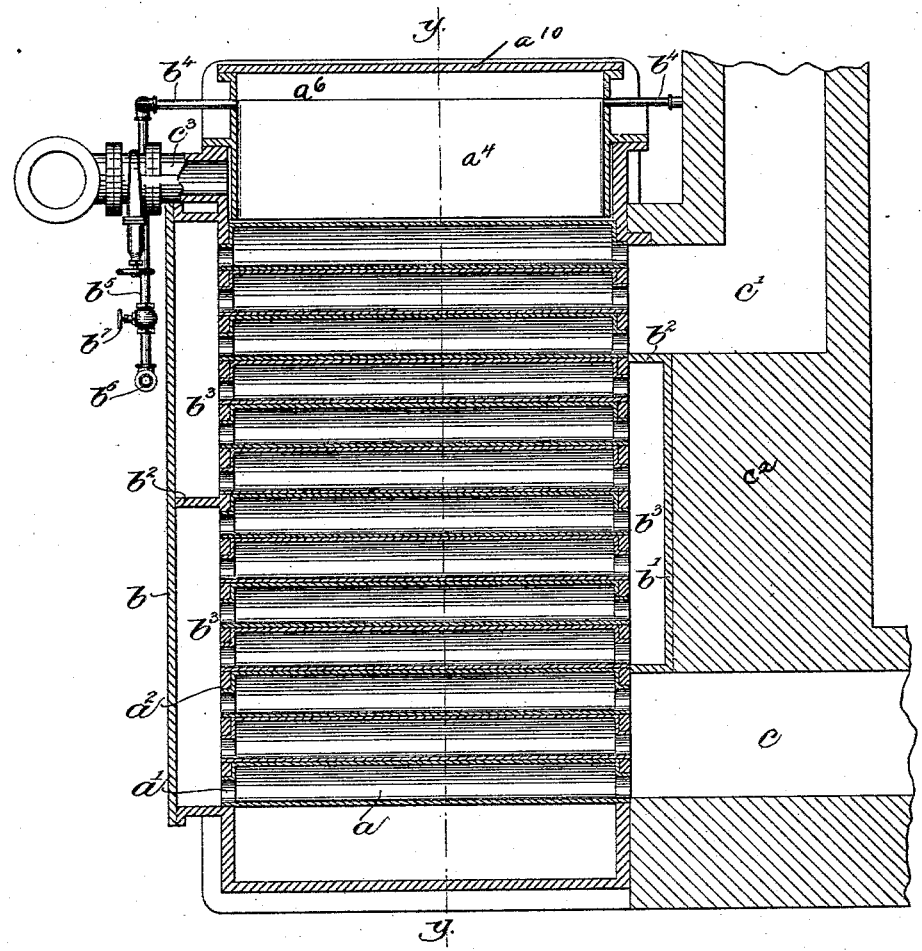

(No Model.) 2 Sheets—Sheet 1.

T. GAUNT.
EVAPORATOR.

No. 414,696. Patented Nov. 12, 1889.

Witnesses.
Frederick L. Emery.
Edgar A. Goddin.

Inventor.
Thomas Gaunt,
by Crosby & Gregory Attys.

(No Model.)
T. GAUNT.
EVAPORATOR.
No. 414,696. Patented Nov. 12, 1889.
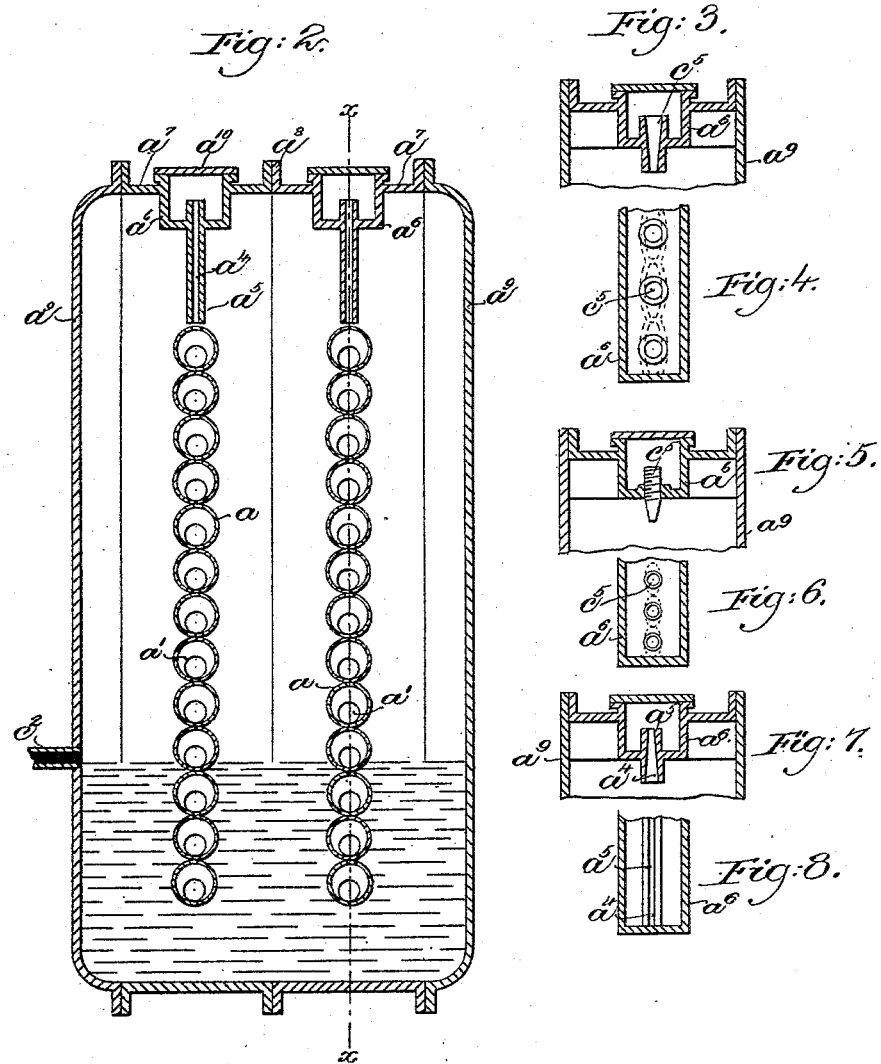

UNITED STATES PATENT OFFICE.

THOMAS GAUNT, OF BROOKLYN, NEW YORK.

EVAPORATOR.

SPECIFICATION forming part of Letters Patent No. 414,696, dated November 12, 1889.

Application filed October 18, 1888. Serial No. 288,413. (No model.)

*To all whom it may concern:*

Be it known that I, THOMAS GAUNT, of Brooklyn, county of Kings, State of New York, have invented an Improvement in Evaporators, of which the following description, in connection with the accompanying drawings, is a specification, like letters on the drawings representing like parts.

This invention relates to apparatus for evaporating or distilling liquids, and is especially adapted, among other things, to be used for the concentration of sugar, soda, and other solutions, and also for the refining or distillation of glycerine, oils, and analogous substances.

My present invention is an improvement upon evaporating apparatus substantially such as shown in another application, Serial No. 258,655, filed by me December 22, 1887; and has for one of its objects to construct the evaporating apparatus as will be described, whereby caloric—such, for instance, as the waste heat of a furnace—may be utilized as the heating agent.

Another feature of my invention consists in a novel feeder or liquid-supply, as will be hereinafter described.

Still another feature of my invention consists in constructing tubes or pipes constituting the evaporating-surface, as will be described, whereby the said tubes or pipes may be brought substantially in contact, for a purpose to be hereinafter specified.

The particular features of my invention will be pointed out in the claims at the end of this specification.

Figure 1 is a vertical section, partially broken out, of an evaporating apparatus embodying my invention, the section being taken on line $xx$, Fig. 2; Fig. 2, a vertical transverse section of the apparatus shown in Fig. 1, the section being supposed to be taken on line $yy$; and Figs. 3 to 8, sectional details to be referred to.

The evaporating-surface is herein shown as composed of tubes $a$, having their ends $a'$ expanded into headers $a^2$, forming the ends of the inclosing case or shell of the apparatus, substantially as in the application referred to, and made smaller than the tubes and eccentric to the centers of the same, for a purpose as will be described.

Each evaporating-surface—there being two herein shown in Fig. 2—has co-operating with it a liquid feed or supply, shown as a slot $a^4$, formed, as shown in Figs. 1 and 2, by plates $a^5$, forming part of a trough or box $a^6$, herein shown as an integral part of a plate $a^7$, the said box or trough being provided with suitable covers $a^{10}$. The plates $a^7$ are provided, as shown, with flanges $a^8$, (see Fig. 2,) by which they are bolted or otherwise secured together and to the sides $a^9$ of the enveloping shell or case to form the top or cover of the said shell; but, if desired, the said plates may be cast in one piece. The headers $a^2$ are provided with covers $b\ b'$, which form, with partitions $b^2$, chambers $b^3$, the cover $b'$ in the present instance being shown as integral with the partitions $b^2$ on one side of the apparatus.

Each feed box or trough $a^6$, as herein shown, is provided at its opposite ends with inlet-pipes $b^4$, communicating by a branch pipe $b^5$ with a supply-pipe $b^6$, connected to a suitable supply tank or reservoir containing the liquid or substance to be evaporated or treated, substantially as in the application referred to, the branch pipe $b^5$ being provided with a suitable valve $b^7$, by which to control the supply of liquid to the feed-trough.

The sides of the slot $a^4$ are extended up into the trough or feed-box above its bottom, so that the liquid substance admitted to the feed-box rises in the said box and overflows the sides of the slot, and is discharged from said slot upon the evaporating-surface in a substantially small volume to form upon the evaporating-surface a sheet or film.

In order that caloric—such as the waste heat of a furnace—may be utilized as the heating agent, one or more of the tubes, preferably the lowermost of the series, communicate with a flue $c$, herein shown as formed in masonry or brick-work $c^2$. The flue $c$ may be the exit-flue of a furnace, whereby the waste heat from the said furnace is admitted to the tubes. The waste heat issuing from the flue $c$ is caused to cross and recross the apparatus through the tubes one or more times, as desired, and finally escapes through the flue $c'$, which may lead to the chimney. The heat as it enters the lower set of tubes from the flue $c$ is of substantially high temperature, and in order that the said heat may be reduced or lowered to such degree as to render the same non-injurious to the tubes, which in practice will preferably be of iron, and so, also, at the same time to reduce the high temperature of the heat before it comes in contact with the upper set of tubes, the liquid-outlet $c^2$ is located in one side of the shell or case above the lowest set of tubes, so that the lowest set of tubes is submerged or covered with liquid which has passed over the upper set of tubes. It will thus be seen that a double evaporation is taking place—namely, evaporation of the liquid as it passes over the evaporating-surface and also evaporation of the liquid covering the lower set of tubes—thereby materially hastening the process of evaporation.

The steam and other products of evaporation arising from the liquid as it passes over the evaporating-surface are conducted from the upper part of the shell or case, as shown, by the outlet-pipe $c^3$, which may be connected to a suitable condenser (not shown) or to a second evaporating apparatus, when two or more apparatus are coupled together for multiple effect, as shown in the application referred to.

In order that the steam passing from the shell or case through the outlet-pipe $c^3$ may not carry off by suction liquid particles, the delivery-plates $a^5$ are extended, preferably, a considerable distance below the feed-trough, as shown in Fig. 2, whereby an increased steam-space is obtained at the top or upper end of the apparatus.

The delivery-slot $a^4$, as shown in Fig. 2, is formed by plates; but instead thereof a substantially continuous slot may be formed, as shown in Figs. 3 and 4, wherein tubes $c^5$ are shown as cast integral with the bottom of the box $a^6$, the said tubes being elongated at their lower end, as indicated by dotted lines in Fig. 4, to form a substantially continuous slot. So, also, the said tubes may be screwed into the box $a^6$, as shown in Figs. 5 and 6.

If desired, the delivery-slot $a^4$ may be made wider at its discharge-mouth, as shown in Fig. 7, the said slot being formed by plates, as shown in Fig. 8.

The ends $a'$ of each tube $a$, as shown in Figs. 1 and 2, are eccentric to the center of the said tubes, and have their lower portion or circumference substantially on a line with the lower portion or circumference of the said tubes, so that a continuous evaporating-surface may be composed of tubes substantially in contact, whereby bridges between the said tubes are dispensed with, and the said evaporating-surface may be employed in an evaporating apparatus wherein steam or fluid is employed as a heating agent, the eccentric ends permitting water of condensation or the liquid employed as the heating agent to flow unobstructedly through the said tubes.

I prefer to employ a separate feed-trough for each evaporating-surface, as by that means each evaporating-surface may be cut out of operation; but, if desired, I may employ a single trough provided with feed-slots $a^4$ for the evaporating-surfaces, the bottom of the said trough constituting the top of the inclosing shell or case.

Instead of making the ends of the tubes eccentric, I may employ nipples set eccentrically in the tubes.

I do not herein claim, broadly, an evaporating apparatus provided with a feed box or trough supported above the evaporating-surface and provided with a delivery slot or opening extended substantially the length of the box and having its sides extended up into the said trough above its bottom, as the same forms the subject-matter of another application, Serial No. 326,582, filed by me October 10, 1889.

I claim—

1. In an evaporating apparatus, an evaporating-surface and a liquid-supply therefor provided with a delivery-opening to discharge the liquid upon the evaporating-surface in a sheet, an enveloping-shell closed at its bottom, and a liquid-outlet located above the bottom of the said shell to immerse the lower portion of the evaporating-surface in a body of liquid, combined with a flue or passage communicating directly with the portion of the evaporating-surface immersed in the body of liquid, whereby caloric may be utilized as the heating agent, the temperature of the caloric being reduced on its passage through the portion of the evaporating-surface immersed in liquid, whereby injurious effect upon the remaining portion of the evaporating-surface is obviated, substantially as described.

2. In an evaporating apparatus, an evaporating-surface composed of tubes having eccentric ends and headers to support said tubes, combined with a liquid feeder or supply for the said evaporating-surface, substantially as described.

3. In an evaporating apparatus, an evaporating-surface composed of tubes having eccentric ends and headers to support said tubes, combined with a feed trough or box provided with a delivery slot or opening, substantially as described.

4. In an evaporating apparatus, an evaporating-surface, substantially vertical headers to support said surface, and division-plates to form chambers, a liquid-supply for said surface, an enveloping-shell closed at its bottom, and a liquid-outlet located above the bottom of the said shell to immerse the lower portion of the evaporating-surface in a body of liquid, combined with a flue or passage communicating through the submerged portion of the evaporating-surface with one of the said chambers, substantially as and for the purpose specified.

In testimony whereof I have signed my name to this specification in the presence of two subscribing witnesses.

THOMAS GAUNT.

Witnesses:
JAS. H. CHURCHILL,
M. RAY.